United States Patent [19]

Donnelly

[11] 3,916,689
[45] Nov. 4, 1975

[54] CAPACITANCE FUEL TANK GAUGE
[75] Inventor: Joseph E. Donnelly, St. George, Vt.
[73] Assignee: Simmonds Precision Products, Inc., Tarrytown, N.Y.
[22] Filed: June 25, 1973
[21] Appl. No.: 373,363

[52] U.S. Cl. ............................................. 73/304 C
[51] Int. Cl.² ........................................ G01F 23/26
[58] Field of Search ............ 73/304 C; 331/109, 176

[56] References Cited
UNITED STATES PATENTS
| | | | |
|---|---|---|---|
| 3,296,553 | 1/1967 | Reid | 331/109 |
| 3,440,564 | 4/1969 | Kuiper | 331/109 X |
| 3,533,286 | 10/1970 | Westcott et al. | 73/304 C |
| 3,543,046 | 11/1970 | Tiffany | 73/304 C X |
| 3,713,045 | 1/1973 | Usuda et al. | 331/109 |
| 3,728,897 | 4/1973 | Wallman | 73/304 |

Primary Examiner—Richard C. Queisser
Assistant Examiner—Frederick Shoon
Attorney, Agent, or Firm—Edwin E. Greigg

[57] ABSTRACT

A capacitance fuel tank gauge utilizing a pair of diodes to rectify the capacitance signal before transmission to the fuel gauge, thereby eliminating effects of stray capacitance and the need for coaxial cables with the advantages of reducing weight and cost.

6 Claims, 2 Drawing Figures

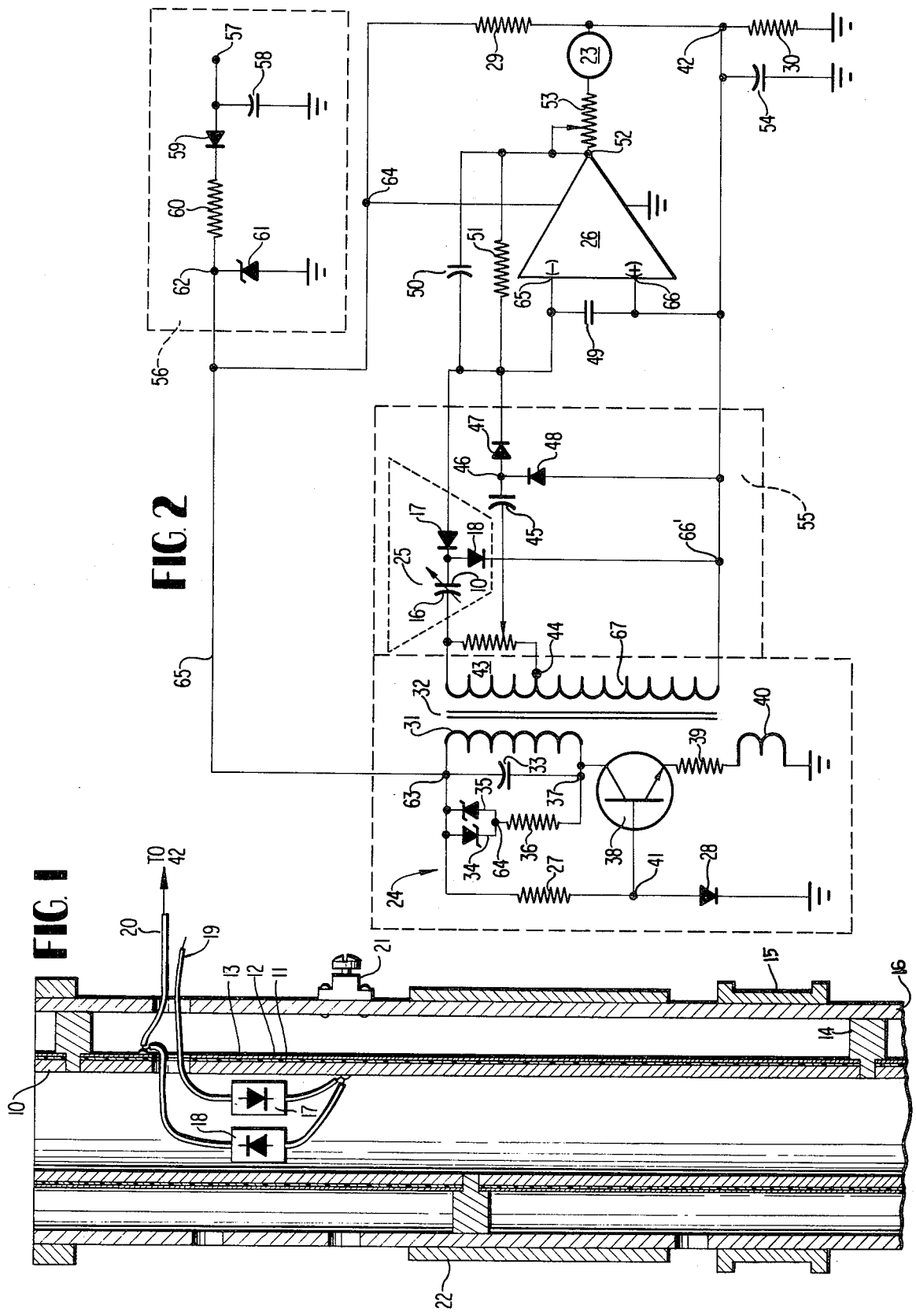

CAPACITANCE FUEL TANK GAUGE

The present invention relates generally to liquid quantity gauge systems and, more particularly, to an improved gauging system of the capacitance type adapted to measure the quantity of liquid in an aircraft tank unit or other liquid container.

In measuring the quantity of liquid contained in a tank, it is known in the art to make use of a sensing capacitor having tubular spaced electrodes immersed therein; the fluid to be measured occupies more or less of the electric field space between the electrodes, depending upon the amount of liquid present.

The dielectric constant of the liquid is different from that of air, hence the capacitance of the tank capacitor will vary with the level of the liquid in the tank.

In a liquid quantity measuring system of the capacitance type, it is essential that a correct indication of the quantity of liquid contained in a tank be obtained.

In order to measure the capacitance of the tubular tank unit, the tank unit is excited by a high frequency signal developed by an oscillator normally mounted some distance from the tank unit.

The tank probe is connected as one leg of a capacitance bridge circuit, the output of said bridge circuit is a current, which is a function of the capacitance of the probe, the excitation frequency, and the voltage amplitude. A capacitance feedback bridge amplifier is used, the output of which is a voltage proportional to the capacitance of the tank probe.

During transmission, the high frequency signal is subject to modification by stray capacitance, which acts in parallel with the tank unit to give a false indication of the true liquid level. To reduce the effects of stray capacitance, a coaxial cable is normally used.

During installation the cable capacity must be tuned out to avoid deleterious effects upon the current and frequency of the excitation source. Individual tuning adjustments are needed for each installation because the cable lengths are relatively long and vary from one installation to the next. Also, since tuned circuits are involved and because all tuned circuits tend to drift, the circuits do not remain stable over long periods of time. Additionally, this signal is then transmitted to the indicating device some distance away where it is, in turn, rectified and displayed on a meter. This, too, requires coaxial cable with much of the same problems described above.

In addition, coaxial cable is expensive, heavy and requires expensive connectors. Even with the use of shielding, stray capacitance effects occur due to cabling within a wiring harness and due to temperature and humidity changes as well.

It is desirable to eliminate the complex and expensive circuitry required in the use of AC signals by converting the system to DC. The advantages are that unshielded cable and connectors could be used with a considerable saving in weight, material, and installation costs.

In view of the foregoing, it is, accordingly, the principal object of this invention to provide a liquid level measuring system of the capacitive type which will be economical in costs, and reduced in weight and complications, while providing increased accuracy.

More specifically, it is the object of this invention to provide a liquid level measuring system of the capacitive type in which signal processing and transmission is performed using DC signals, and wherein the problems associated with AC signal processing as well as transmissions are eliminated.

It is a further object of this invention to produce a capacitance type of liquid measuring system in which a single conductor wire can be substituted for the coaxial cable.

It is a further object of this invention to produce a capacitance-type of liquid measuring system which is insensitive to effects of stray capacitance or voltage variations.

It is a further object of this invention to produce a capacitance-type liquid measuring system which will operate on the different voltage systems used in aircraft without the need for changing the basic components.

Briefly stated, these objects are accomplished by immediately rectifying the output of a capacitance tank probe by inserting diodes within the probe, and using a DC amplifier for amplifying the signal for transmission to the gauge unit.

For a better understanding of the invention, as well as other objects and further features thereof, reference is made to the following description to be read in conjunction with the accompanying drawings, wherein like components in the various views are identified by like reference numerals.

FIG. 1 illustrates in cross a view of the tank unit probe showing the inclusion therein of a pair of diodes; and FIG. 2 illustrates a schematic diagram of a basic form of a DC capacitive fluid gauging system.

Referring now to the drawings, and more particularly to FIG. 1, there is shown an inner electrode 10 of a sensing probe to be inserted into the fluid to be measured. This inner electrode 10 is usually made of a metallic material. An insulating coating 11 is placed completely around electrode 10, said insulating coating being made of Nylon, Teflon or Kel-F, which are all commercially available. Over insulating coating 11 is placed a conductive layer 12, which is usually sprayed on. The layer 12 is normally patterned to the profile requirements of the fuel tank, in a commonly known and used manner, to provide linear output readings. As aircraft tank units are not necessarily linear, a means must be provided to enable the system to provide linear readings. By designing the shape of the conductive layer in relation to the shape of the liquid container, the indicating device of the gauge may be calibrated linearly in terms of quantity of liquid.

The entire inner electrode is covered by another insulating coating 13, as indicated. This coating 13 completely envelopes the inner electrode and may consist of the same material which makes up the substance of insulating coating 11. The insulating spacers 14 next are placed over the insulating coating to separate the outer electrode 16 from the inner electrode 10. Certain considerations must be taken into account in the placement of these spacers, but need not be explained in detail in describing the present invention. The flanges indicated at 15 and 22 are placed around outer electrode 16 to assist in the installation of the sensing probe into an aircraft fuel tank.

Of course, it is to be understood that the present invention of an electrical circuit can be used in conjunction with capacitance type probes of different construction than the probe described in detail above.

The diode 17 is encapsulated in a plastic or epoxy resin that is insensitive to the liquid in which the fuel probe is immersed and placed within the inner electrode 10. The diode 18 is also encapsulated in the same material as the diode 17 and also placed into the inner electrode. It is to be appreciated that the diodes 17, 18 could be mounted on the exterior of the outer electrode 16. The positive side of each of the diodes 17 and 18 is securely connected to the inner electrode 10. The negative side of the diode 18 is connected to the output through conductor wire 19. The negative side of the diode 18 is connected to the conductive coating 12 which, in turn, is connected to the signal ground through conductor wire 20. The outer electrode 16 is electrically connected to a high frequency excitation signal by means of connector 21.

The above description of the mechanical construction of the tank probe has been used to describe a typical installation of diodes within the probe; modification of probe construction does not modify the electrical results of the diode connections.

Referring at this time to FIG. 2, there is shown schematically a frequency and amplitude stabilized excitation source 24 in association with a capacitance tank probe 25 with diode 17 and 18 which are made part of a bridge circuit 55 connected to DC amplifier-integrator 26, the output of which is connected to indicating meter 23. The power supply 56 powers the system, the voltage of which may vary from 10 to 40 VDC without degradation of the basic functions. Connected from point 57, to which a 10-40 VDC voltage is applied, capacitor 58 is connected to a ground which functions as an EMI suppressor. Also connected by its negative lead to point 57 is diode 59, the positive lead of which is connected to the resistor 60. The other lead of resistor 60 is connected to the positive lead of the Zener diode 61 at point 62, and the negative lead of the diode 61 is connected to ground. Resistor 60 serves as a current limiter and Zener diode 61 as a maximum voltage limiter, as is well known in the art.

The maximum supply voltage available at point 62 is connected by lead 65 to the voltage divider, made up of resistor 27 connected at its other side to diode 28 which is grounded by its other lead forming the voltage divider for the oscillator, in which the voltage across diode 28 remains constant regardless of variations and supply voltage. The positive side of the voltage divider, made up of resistor 27 and the diode 28, is connected to the tank circuit composed of winding 31 of transformer 32, which is a linear permalloy core toroidal transformer having a positive temperature coefficient, and capacitor 33, connected in parallel with winding 31, which is a polystyrene tuning capacitor having a negative temperature coefficient. This provides frequency stabilization since temperature changes, which may cause the values of the capacitor and transformer to shift slightly, are opposite, in effect maintaining L × C constant. The positive side of the Zener diode 34 and the negative side of Zener diode 35 are connected to one end of the tank circuit at point 63; the other ends of the diodes are joined together and connected to resistor 36 at point 64, the other end of which is connected to the opposite side of the tank circuit at point 37. With this construction, the Zener diodes 36 and 37 limit the maximum voltage swing of the tank circuit and therefore stabilize the maximum amplitude of the oscillator. The resistor 36 is placed in circuit to shape the waveform and obtain a smooth sinewave output. The collector of transistor 38 is connected to point 37 and the emitter of transistor 38 is connected to one end of the resistor 39, the other end of which is connected to feedback winding 40 which is, in turn, connected to the ground. The base of transistor 38 is connected to point 41 between resistor 27 and the diode 28 of the oscillator voltage divider, and therefore, the bias voltage on the base of the transistor is fixed by the diode voltage drop and remains constant, thus further stabilizing the output amplitude of the oscillator as heretofore described. The output winding 67 of transformer 32 is connected to plate 16, the low impedance plate of the tank unit, as shown schematically; the other end of the winding is connected to point 42, the junction between resistors 29 and 30, which form a voltage divider between point 64 and ground. The inner plate 10 of the tank unit, the high impedance plate, as shown schematically, is connected to the negative side of the diode 17 and the positive side of the diode 18. The positive side of the diode 17 is connected to the negative input point 65 of the DC amplifier 26, and the negative side of the diode 18 is connected through point 66' to point 42, as previously described. The variable resistor 43 is connected at one end to plate 16 of the tank capacitor and at the other end to a tap point 44 on the output winding 67 of the transformer 32; the arm of variable resistor 43 is connected through capacitor 45 to point 46 which is the junction between the positive lead of the diode 47 and the negative lead of the diode 48. The negative lead of diode 47 is connected to the negative input of amplifier 26, point 65, the positive lead of diode 48 being, in turn, connected to point 42 as previously described. Connected across the negative and positive input terminal points 65 and 66 of amplifier 26 is capacitor 49 for suppression of EMI. The positive input of amplifier 26 is then connected to point 42.

By careful study of the diagram, it can be seen that the diodes 17 and 18 of the tank probe unit and diodes 47 and 48 form a bridge circuit. As the current in transformer winding 67 swings positive, capacitance tank probe 25 is charged and current flows through diode 18 but is blocked by diode 17. As the current in winding 67 swings negative, the capacitance tank probe charge oppositely and current flows through diode 17, making the input to DC amplifier 26 negative with respect to the ground.

The empty tank unit current is negated by an opposite polarity DC signal, derived from the low impedance capacitor plate 16 and the capacitor-diode network composed of capacitor 45 and the diodes 47 and 48. Using the same voltage and the capacitor 45 negates the effects of frequency and amplitude change on the empty system adjustment. Capacitor 50 and resistor 51 are connected from the output of amplifier 26 point 52, to the negative input of the amplifier, a commonly known construction; resistor 51 provides for the proper gain of the amplifier, and capacitor 50, across the amplifier, integrates the half wave rectified current from the tank unit and capacitor 45. The output of amplifier 26, point 52, is connected to variable resistor 53 which, in turn, is connected to the positive side of meter 23. It should now be evident that variable resistor 53 is used to control the output current of amplifier 26 which is fed to meter 23. Capacitor 54 is connected from point 42 to ground across resistor 30 to provide an AC ground for non-inverting input of the operational amplifier. The output of the tank unit, which applied to the negative input of the amplifier 26, is halfwave rectified DC signal, which will vary from a value established by the tank probe capacitor being uncovered to a maximum value determined when the tank probe capacitor 25 is completely covered by the fluid being gauged. The meter 23 must be adjusted to indicate these changes, this being accomplished by adjusting variable resistor 53 to achieve proper maximum reading on the meter, and the zero adjustment being achieved by adjusting variable resistor 43.

The amplifier 26 is used as an integrator, as hereinbefore mentioned, by using capacitor 50, which is chosen to have a large capacitance to smooth the input and obtain a constant level DC. The resistor 51 in the feedback resistor adjusts the gain of the amplifier, the gain being adjusted to obtain a change in output from the empty to full reference points compatible with the meter used. It has been found that a change in output of approximately 4 VDC gives adequate insensitivity to stray fields.

The combination of capacitor 50 and resistor 51 has a time constant, which is on the order of several seconds, preventing liquid level slosh from appearing on the meter.

The operating point of amplifier 26 is referenced to the negative side of the meter by connecting both the positive input of the amplifier and the negative side of the meter to point 42 in the voltage divider, made up of resistors 29 and 30 connected across the supply voltage.

It should be evident now to those skilled in the art that this results in the output delta (change) of the amplifier always being set properly with relation to the supply voltage, and that further, the resistors 29 and 30 need not be precision resistors since the output change of the amplifier is a function of the tank unit excitation voltage and the change in tank unit capacitance only.

The use of the diodes 17 and 18 introduces an error if low voltages are used, since they introduce a voltage drop of approximately 0.6 volts, which varies with temperature. To ensure that variations in voltage drop do not effect the accuracy of the output, a voltage of at least 20 Vrms is required, the maximum variations over the required temperature range then becoming less than meter accuracy and having no effect on the accuracy of the system.

It also should be clear from the foregoing discussion that the construction of this capacitance liquid gauging system is insensitive to stray capacitance and voltage variations which, therefore, allow the use of a single conductor wire instead of coaxial cable between all elements of the system regardless of their physical location. Further, because of the unique and novel stabilizing techniques used within the oscillator and the referencing techniques used for the association of the amplifier and meter, the system can be used with widely varying voltage supply systems without affecting the accuracy of the system.

Since the description of this invention shows the preferred embodiment, it must be realized that modifications may be made without affecting the true spirit of this invention and that such changes and modifications are considered to fall within the scope of this invention.

What is claimed is:

1. An electrical measuring circuit for capacitance fuel gauge measuring systems independent of input power variations comprising, in combination: an amplitude and frequency stable signal source means associated with a capacitance-type liquid tank probe means for immersion into non-gaseous fluids, said frequency stable signal source means being arranged to excite the capacitance tank probe, said liquid tank probe means further including rectifying means connected to said liquid tank probe means to convert the output of said liquid tank probe means to DC; first balancing means to balance out frequency and amplitude variations on empty system indication; D.C. amplifier means connected between said rectifying means and a DC display means, said DC amplifying means being connected as an integrator means, the output of said amplifier means being displayed on said display means; and second balancing means associated with said tank probe for setting maximum reading on said display means, wherein said first balancing means is a bridge circuit which includes said tank probe and said rectifying means, and further includes a potentiometer, the tap of which is connected to form a series circuit with additional rectifying means and a capacitor said series circuit connected in parallel with the tank capacitance which are connected across the opposite points on said bridge circuit, the balancing voltage being derived from said potentiometer being connected across the output of the amplitude and frequency stable excitation source, and further including a voltage dividing means and wherein said DC amplifier means connected between said rectifying means and said display means has its operating point referenced to the negative side of said display means which is also referenced to the mid point of said voltage dividing means which is connected to the power supply, said referencing rendering the output of said amplifying means displayed on said display means insensitive to supply voltage variations.

2. An electrical measuring circuit for capacitance fuel gauge measuring systems as claimed in claim 1, wherein the frequency stable signal source includes a tank circuit, said tank circuit further including a pair of Zener diodes which are in parallel with the tank circuit.

3. An electrical measuring circuit for capacitance fuel gauge measuring systems as claimed in claim 2, wherein the frequency stable signal source means includes a driving transistor for the tank circuit.

4. An electrical measuring circuit for capacitance fuel gauge measuring systems as claimed in claim 3, wherein said frequency stable signal source includes a voltage dividing means, said voltage dividing means including a diode connected to ground and arranged to bias said driving transistor.

5. An electrical measuring circuit for capacitance fuel gauge measuring system as claimed in claim 2, wherein the tank circuit includes a capacitor with a negative temperature coefficient and a transformer with a positive temperature coefficient, whereby the signal source is stabilized in frequency.

6. An electrical measuring circuit for capacitance fuel gauge measuring systems as claimed in claim 1, wherein said display means is a meter.

* * * * *